United States Patent [19]

Hasquenoph et al.

[11] 4,318,561
[45] Mar. 9, 1982

[54] CENTRAL-CONTROLLED DEVICES FOR CARRYING AND WEDGING LOADS UNDER AIRCRAFT

[75] Inventors: Jean H. Hasquenoph, Lagny; Pierre F. Coutin, Paris, both of France

[73] Assignee: R. Alkan & Cie, France

[21] Appl. No.: 84,347

[22] Filed: Oct. 12, 1979

[30] Foreign Application Priority Data

Oct. 17, 1978 [FR] France ................ 78 29495
Apr. 20, 1979 [FR] France ................ 79 10010

[51] Int. Cl.³ .......................................... B64D 1/02
[52] U.S. Cl. ............................ 294/83 R; 89/1.5 B; 89/1.5 G; 244/137 R
[58] Field of Search ............ 294/83 R, 83 A, 83 AB, 294/83 AE; 89/1.5 R, 1.5 B, 1.5 F, 1.5 G, 1.5 H; 244/118.1, 137 R

[56] References Cited

U.S. PATENT DOCUMENTS

| 3,056,623 | 10/1962 | Herbert .................... 294/83 R |
| 3,610,094 | 10/1971 | Craigie ................. 294/83 AE X |
| 3,670,620 | 6/1972 | Paraskewik ............. 294/83 R X |
| 4,050,656 | 9/1977 | Peterson ................ 294/83 AE X |
| 4,102,520 | 7/1978 | Hasquenoph et al. ........ 244/137 R |
| 4,168,046 | 9/1979 | Hasquenoph et al. ....... 294/83 R X |
| 4,183,480 | 1/1980 | Jakubowski ............... 244/137 R |

FOREIGN PATENT DOCUMENTS 1240692 8/1960 France .................... 244/137 R

Primary Examiner—Johnny D. Cherry
Attorney, Agent, or Firm—William A. Drucker

[57] ABSTRACT

A device for suspending and wedging loads under aircraft ensures, through a central control, the wedging of a load carried under an aircraft at a level determined by a pair of suspension hooks subjected to balanced stresses. The central control is obtained by sleeves which slide vertically under the action of rotary shafts and bevel-tooth gears, the vertical translation of these sleeves ensuring the downward movement of parts of bearings engaging the load.

6 Claims, 6 Drawing Figures

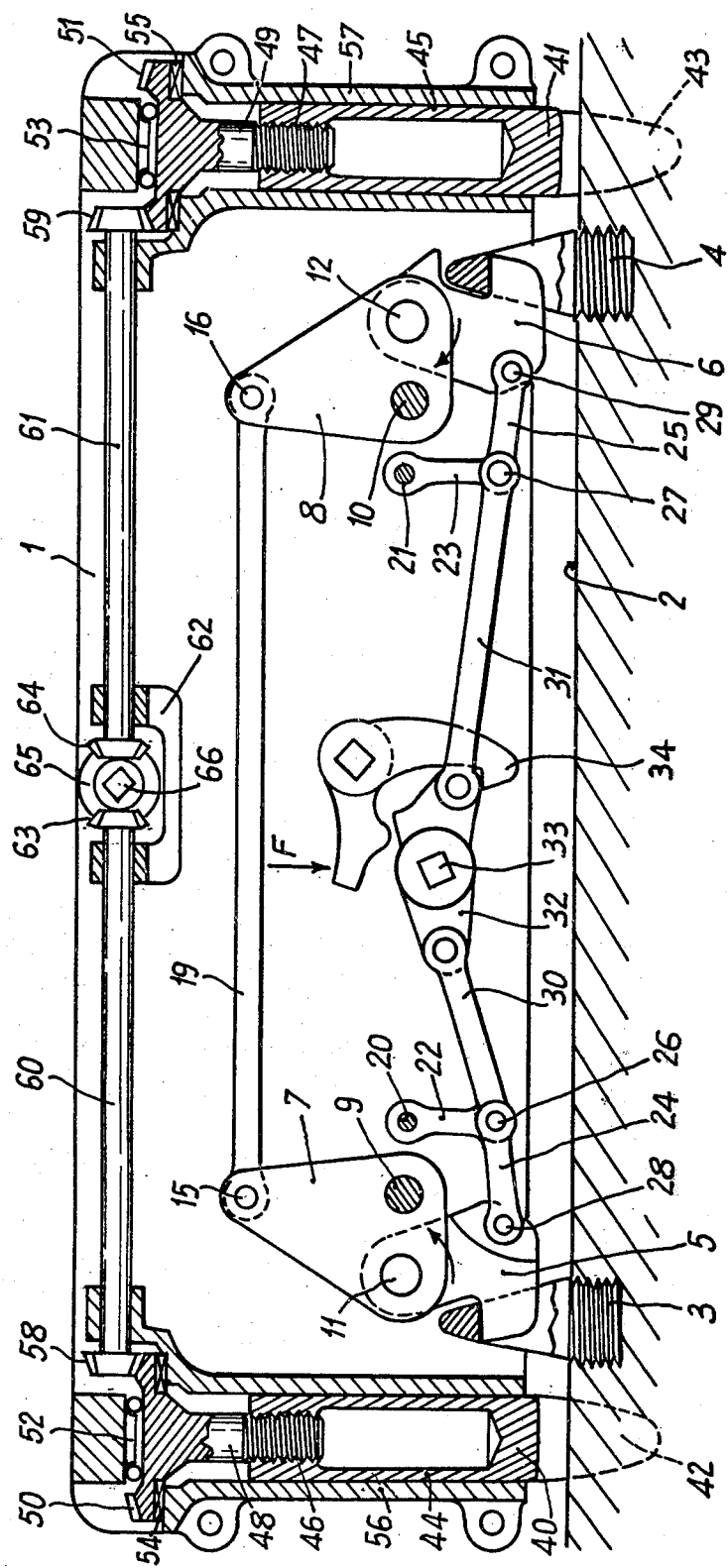

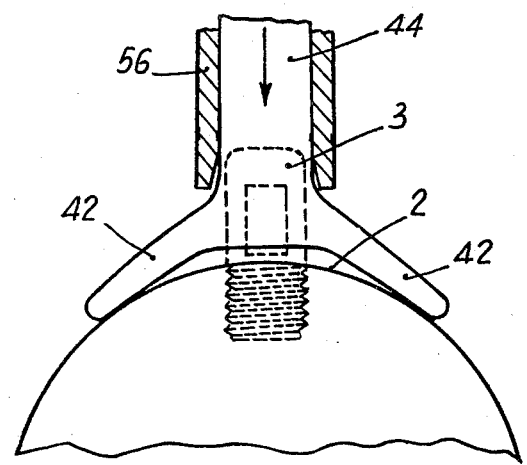
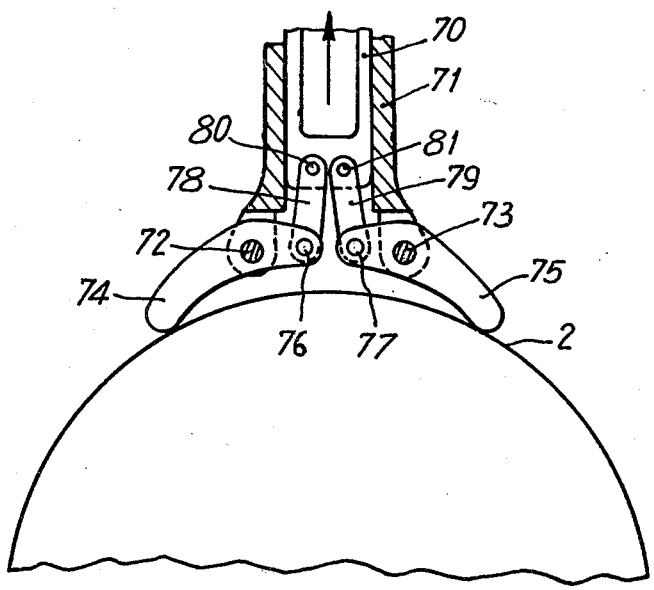

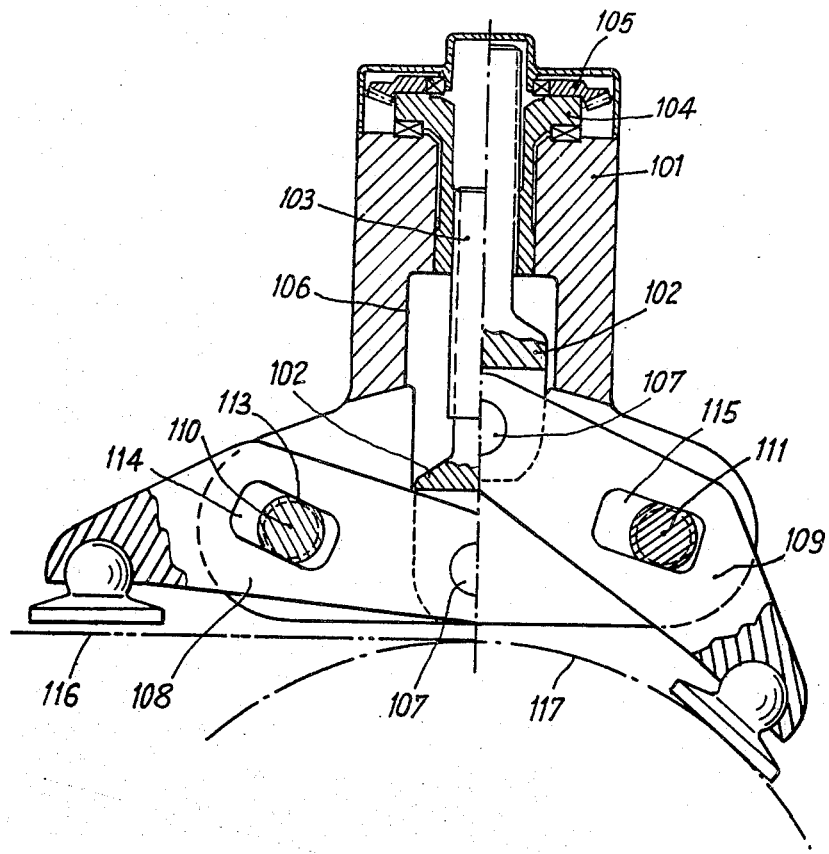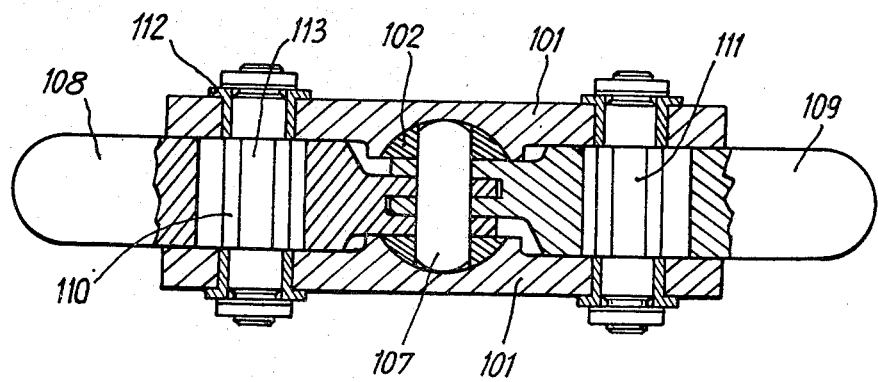

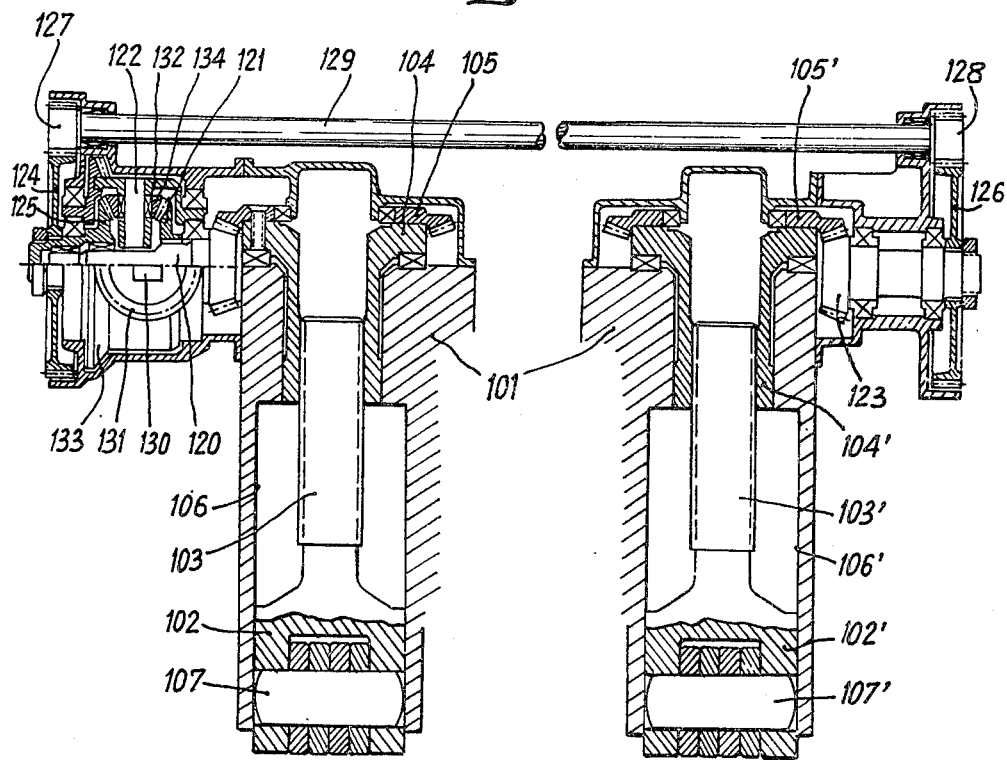

CENTRAL-CONTROLLED DEVICES FOR CARRYING AND WEDGING LOADS UNDER AIRCRAFT

BACKGROUND OF THE INVENTION

As a rule, loads carried under aircraft comprise either two spaced rings or two so-called saddles. These rings or saddles are engageable by corresponding hook means of the locking system.

In devices of this character the load may be locked in position, as disclosed in the U.S. patent application Ser. No. 949,484, now U.S. Pat. No. 4,202,576, filed on Oct. 6, 1978 by the same applicants, by causing the load to engage fixed bearing points (rigid with the carrier device or the aircraft structure) through a complementary upward movement of the hook means. In contrast thereto other known propositions consist in lowering the load bearing points either through a downward movement of translation or through a rotation about fixed pivot members carried by gripper arms.

It is also possible to wedge the load in position by using wedging screws in the form of small jacks disposed at the end of fixed arms disposed on top of the load.

In fact, many devices have already been proposed up to now for carrying and wedging loads under aircraft, and all of them have various advantages and also various shortcomings.

The main advantageous features characterising the device disclosed in the above-mentioned patent application are on the one hand the equal distribution of stress among the two hook means due to the use of a rudder-bar like connecting-rod system, and on the other hand a centralized wedging control capable of acting very quickly. As already mentioned, this device is characterised by complementary simultaneous upward movements of the hook means.

However, when the upper portion of the airbone load, irrespective of its shape, must be positioned at a well-defined height in relation to the carrier device or when it is necessary to have the possibility of carrying and wedging loads having different diameters, the necessary complementary movement of the hook means is in most instances either impossible or insufficient.

SUMMARY OF THE INVENTION

The device constituting the subject-matter of the present invention comprises the advantageous features of the above-mentioned device, i.e. the equal distribution of stress among the hook means and a centralized control of the wedging action, but provides at the same time an accurately determined height of the load by locking the load through the lowering of the bearing points thereof, as will be explained presently.

To this end, the device for hooking up and wedging loads carried under aircraft is characterised by the combination of a centralized and simultaneous control of vertically movable bearing points acting upon the load at two longitudinally spaced locations adjacent a pair of suspension hooks and of a mechanism, interposed between these two locations, capable of balancing the efforts transmitted to the pair of suspension hooks.

BRIEF DESCRIPTION OF THE DRAWINGS

FIG. 1 is a longitudinal section showing a ring-type load suspension device fitted in position;

FIG. 2 is a fragmentary end view of the device shown in FIG. 1, with the V-shaped bearing members lowered for engagement with the load through a vertical movement of translation;

FIG. 3 illustrates in fragmentary end view pivoting gripper-like bearing members engaging the load by bearing thereagainst as a consequence of the vertical upward movement of sliders to which the gripper arms are connected through links so as to cause said arms to rotate about fixed longitudinal axes;

FIG. 4 is a vertical cross section and end view of a gripper-type bearing device of which the two arms pivoted directly to a slider are provided with guide slots engaged by pivot members having fixed centres, the left-hand half of the Figure corresponding to a load having a flat top surface, while the right-hand half corresponds to a cylinder-like load;

FIG. 5 illustrates the bearing device of FIG. 4 but seen in horizontal section, and FIG. 6 illustrates the centralized control system for actuating bearing devices of the type shown in FIGS. 4 and 5, with the means for transmitting the drive from the control system to the bearing devices.

DESCRIPTION OF THE PREFERRED EMBODIMENTS

Referring first to FIG. 1 of the drawings, the reference numeral 1 designates diagrammatically the contour of the case enclosing the carrier device, 2 being the upper portion of the load, 3 and 4 the rings fitted to the load, 5 and 6 the suspension hooks engaging said rings 3 and 4, and the reference numerals 7 and 8 designate triangular bell-crank levers fulcrumed by means of fixed pivot members 9 and 10, respectively, to the carrier device 1. The hooks 5,6 are pivoted to the ends 11,12 of levers 7,8, respectively. The ends 15 and 16 of levers 7 and 8 are interconnected by a coupling rod 19. Other fixed pivot members 20 and 21 are provided for rotatably mounting corresponding arms 22 and 23, respectively, to which the hook members 5 and 6 connected via links 24 and 25 pivoted to the relevant crankpins 26 and 27 and to the hook members via other pivot members 28 and 29, respectively. It will be seen that if desired the axes of pivot members 20 and 21 could merge with those of pivot members 9 and 10, respectively. At the ends 26 and 27 of arms 22 and 23, connecting-rods 30 and 31 are pivotally connected at one end, the opposite ends of these connecting-rods being pivotally connected to a common rocker 32.

According to a well-known arrangement the axes of these connecting-rods 30,31 are relatively close to that of pivot shaft 33 of rocker 32, in order to provide a substantial stress scaling-down ratio, whereby a simple pawl such as 34, which is no part of this invention, is sufficient for safely preventing any untimely disengagement or opening of hook members 5 and 6. This disengagement or opening, and consequently the release or jettisoning of the load supported thereby, is obtained when necessary through known means capable of exerting on this pawl 34 an effort in the direction of the arrow F, so as to cause the counter-clockwise rotation of this pawl 34.

FIG. 1 also shows at 40 and 41 V-shaped bearing members engaging the top surface of load 2. Only the V-branches thereof, disposed behind the plane of the Figure, are shown at 42 and 43.

The reference numerals 44 and 45 designate the cylindrical sliding portions of bearing members 40 and 41, respectively. Tapped portions 46 and 47 are provided in the upper portions of said sliding portions 40 and 41, respectively, for engagement by control screws 48 and 49 having bevel teeth 50 and 51 cut in their heads, the latter also comprising thrust bearings preferably of the ball or needle type 52,53 or 54,55 according as the thrust reaction is directed upwards or downwards as will be seen presently. The cylindrical sliding portions 44 and 45 are slidably fitted in fixed sleeves 56 and 57 rigid with the suspension or carrier system 1. However, these cylindrical portions 44 and 45 are held against rotation not only by the load but also through known means (not shown) such as a groove and nut device.

The bevel teeth 50 and 51 are in constant meshing engagement with bevel pinions 58 and 59, respectively, driven simultaneously by rotary shafts 60 and 61 driven in turn from a central gear 62 consisting of a set of three bevel pinions 63,64 and 65 with pinions 63 and 64 rigid with said rotary shafts 60 and 61, respectively, the intermediate pinion 65 driving these two pinions 63 and 64, as shown. This central driving pinion 65 may be driven manually by means of a square-sectioned shaft 66 or any other suitable drive means. It is evident that this driving pinion 65 may also be disposed across anyone of the two bevel pinions 50 or 51, in order to simplify the device, if it is admitted that the efficiency thereof may be better at one of the bearing members without any inconvenience.

In FIG. 2, the reference numeral 2 designates the load, 3 being a ring rigid therewith and 42 the arms of the V-shaped bearing member, 44 designating the sliding portion of the bearing member in the fixed sleeve 56; furthermore, the arrow shows the direction of the vertical sliding movement necessary for wedging the load.

In FIG. 3 there is shown in end view a linkage comprising a portion 70 slidably engaging the bore of a fixed sleeve 71. At the lower end of this sleeve a pair of pivot members 72 and 73 constitute the fulcri of a pair of two-armed levers 74 and 75 of the gripper-like bearing device. The opposite ends 76 and 77 of these arms are pivotally connected to a pair of links 78 and 79, respectively; these links are attached by pivot members 80 and 81 respectively to the sliding portion 70.

The mode of operation of the device illustrated in FIGS. 1 to 3 of the drawings will now be described with reference firstly to the form of embodiment shown in FIGS. 1 and 2 of the drawings. It will be seen from the onset that the force transmitted from rings 3 and 4 to the corresponding hook members 5 and 6 tends to rotate these hook members about their pivot member 11 and 12 in the direction of the arrows as shown in FIG. 1. Consequently, the connecting-rods 30 and 31 are constantly subjected to a compressive effort causing the rocker 32 to abut the pawl 34. This arrangement, similar to the one disclosed in the U.S. patent application Ser. No. 949,484 mentioned in the foregoing departs however therefrom by the fact that the triangular or bell-crank levers 7 and 8 are no more interconnected by a stretching-screw, this function being devolved in this modified arrangement to a simple coupling rod 19 affording nevertheless a uniform distribution of stress among the two hook means. In fact, a pivot member such as 11, associated with the left-hand triangular lever 7 and urged downwardly by the stress exerted by ring 3 on hook means 5, is held in position only by the tractive effort exerted by said rod 19 on triangular lever 7, this force being necessarily counterbalanced by an equal and opposed tractive effort exerted by this rod 19 on the other triangular lever 8 retaining the hook means 6.

This assembly, corresponding to a rudder or compensator device, is such that the total load is equally distributed among the two hook means 5 and 6, thus avoiding the application of an overload to one hook to the benefit of the other hook.

As already mentioned hereinabove, the load is wedged by means of a single control system causing the pinion 65 to rotate and thus drive simultaneously the driven pinions 63 and 64 rigid with one end of shafts 60 and 61 carrying at their other ends pinions 58 and 59 meshing with the toothed heads 50 and 51 of screws 48 and 49. It is clear that this rotation of screws 48 and 49 is attended by the downward movement of translation of bearing members 40 and 41 guided in sleeves 56 and 57, respectively, until they engage the load 2. In this case, the reaction due to the prestress exerted systematically on the load 2 is balanced by the pair of thrust bearings 52 and 53.

Another wedging possibility is contemplated with the same control device but by reversing the direction of rotation of screws 48 and 49 and using the arrangement illustrated in FIG. 3. When pinion 65 is rotated in the clockwise direction (FIG. 3), the sliding portion 70 is caused to rise in sleeve 71, thus pulling the links 78 and 79 upwardly and rotating through pivot members 76 and 77 the levers 74 and 75 of the bearing device. These two levers, by pivoting about the fixed pivot member 72 and 73, exert a pressure on the load 2 so as to hold same against movement. The reaction due to the prestress exerted by the bearing member against the load 2 is balanced in this case by the thrust bearings 54 and 55.

Of course, the complete device illustrated in FIGS. 1 to 3 of the drawings can also be used with double hook means corresponding to the so-called saddle members contemplated originally on the loads for carrying same under aircraft.

In certain cases, the load to be carried under aircraft may have a substantially flat top surface or in contrast thereto a cylindrical surface of relatively small radius. Under these conditions the movements of the wedging arms shown in FIG. 3 between the permissible end positions are relatively long, and this also applies to the angular movements of the corresponding links 78 and 79. On the other hand, the loads to be carried under aircraft may reach such high values that prohibitive over-all dimensions of the overloaded links may result. This problem may be solved by substituting for the links 78,79 a device in which the ends of arms 74,75 are pivoted directly to a sliding member and driven for vertical sliding movement. The momentary centres of rotation of the arms, which cannot be fixed on these arms as in the preceding form of embodiment (FIG. 3) are themselves adapted to slide, as will be explained presently with reference to FIGS. 4 and 5.

On the other hand, the stress exerted on the hook means which, in the form of embodiment of FIG. 1, is balanced by providing between these hook means a linkage corresponding substantially to a rudder device may also be balanced by using equivalent means consisting of a differential gear interposed in the centralized mechanical system controlling the front and rear bearing members, whereby this centralised control system is applicable to all devices for carrying loads under aircraft which does not include hook means operatively connected to a mechanism corresponding to a rudder device.

Moreover, when this centralized control system is relatively remote from the bearing members, it is well to transmit the drive through a rotary shaft to which a relatively low torque is applied, and to this end it is contemplated according to the present invention to combine the above-mentioned differential with a torque scaling-down gear and to restore the stress equality at each bearing means by using a step-up gear, as will be described hereinafter with reference to FIG. 6.

Referring now to FIG. 4 of the drawings, the reference numeral 101 denotes the frame structure of the carrier device, 102 being the vertical slider rigid with the screw 103 engaging the rotary nut 104 rigid in turn with a bevel toothed wheel 105. The slide 102 is adapted to move in the bore 106 formed in the frame structure 101 and is pivotally connected by means of a pivot member 107 to a pair of arms 108 and 109. Fixed pivot members 110, 111 for guiding the pivotal movements of arms 108 and 109 are supported by the frame structure 101 provided to this end with bearings such as 112 (FIG. 5). These pivot members 110,111 have flat faces such as 113 formed thereon in order to provide adequate contact surfaces for engagement with the side faces of elongated holes 114,115 formed through said arms 108 and 109.

The left-hand half of FIG. 4 shows the upper, substantially flat surface 116 of a flat load, and the right-hand half shows the cylindrical surface 117 of a load having a relatively small diameter. The horizontal section of FIG. 5 corresponds to a position of the bearing members in which the pivot member 107 is level with pivot members 110 and 111.

FIG. 6 illustrates the front and rear bearing members, the reference numeral 101 designating likewise the frame structure of the carrier device. Furthermore, the reference numerals 102 and 102' designate the front and rear sliders with the relevant screws 103 and 103' rigid therewith and engaging rotary nuts 104 and 104' adapted to be actuated by bevel toothed wheels 105 and 105'. The sliders 102 and 102' are movable in bores 106, 106' so as to move the pivot members 107 and 107' to which the arms provided with swivel bearing members are fulcrumed.

A bevel pinion 120 is in constant meshing engagement with the bevel toothed wheel 105 and rigid with a sun wheel 121 of differential 122. Another bevel pinion 123 is in constant meshing engagement with the other bevel toothed wheel 105'.

A cylindrical or spur toothed wheel 124 is rigid with the output sun wheel 125 of differential 122 and another cylindrical or spur toothed wheel 126 is rigid with the bevel pinion 123. Spur pinions 127 and 128 mesh with the spur wheels 124 and 126, respectively, and are operatively interconnected by a rotary shaft 129 of relatively small diameter. A square-sectioned stub shaft 130 or an equivalent means is rigid with a bevel toothed wheel 131 for driving the differential gear case 132; and this wheel 131 is at the same time in constant meshing engagement with a crown wheel 133 rigid with the differential gear case 132 supporting the planet pinions 134 meshing simultaneously with the sun wheels 121 and 125 in the conventional manner.

This modified form of embodiment operates as follows. When the slider 102 is in its lowermost position, as shown in the left-hand portion of FIG. 4, the arms 108 and 109 fulcrumed to pivot members 110 and 111 are of course in their maximal open position corresponding for example to the wedging of a flat-topped load. When the slider 102 rises as a consequence of the actuation of the centralised control means, the arms 108 and 109 are caused to pivot about the pivot members 110 and 111, but the distance between the axes of pivot members 110 and 111, on the one hand and the axis of pivot member 107, on the other hand, varies since the pivot member 107 is guided along a vertical straight path. The guide paths consisting of elongated holes 114 and 115 are capable of absorbing this variation in the distance between centres. The arms 108 and 109 can thus move gradually from the position shown in the left-hand portion of FIG. 4 to the position shown on the right-hand side of the same Figure, which corresponds to the wedging of a cylindrical load.

It will be readily understood that the mode of operation of this device is similar when the elongated holes 114 and 115 are fixed and formed in the frame structure 101, with the pivot members 110 and 111 rigid with the arms 108 and 109, respectively. The variation in the distance between centres is also in this case absorbed by the movements of pivot members 110 and 111, rigid with the arms 108 and 109, in said elongated holes 114 and 115 of the frame structure 101.

Since the load position is determined by the vertical position of the hook means in case the hook means are not mounted in the "balance" condition, it is not possible, unless particular arrangements are provided in the transmission, to ensure either a simultaneous contact between the front and rear bearing members and the load, or an equal degree of prestress. FIG. 6 illustrates this particular arrangement. The movements of the bearing members are obtained by rotating the square-tipped stub shaft 130 or equivalent means, by using a spanner or the like. This rotation is attended by the rotation of the case 132 of differential 122 via crown wheels 131 and 133. The planet pinions 134 distribute the rotational torque among the sun wheels 121 and 125 so as to cause the front and rear bearing members to contact the load by taking advantage of the usual differential effect.

In the case illustrated in FIG. 6, the control means centralised at 130 is located near the bearing device shown in the left-hand portion of the Figure. The wedging torque is imparted directly to this bearing device through the sun wheel 121 and the bevel pinion 120 rigid therewith. On the other hand, the equivalent wedging torque is transmitted to the other bearing device via the transmission shaft 129 interconnecting pinions 127 and 128. It is assumed that the symmetrical pinions 127–124 and 128–126 are the former a step-down gear and the latter a step-up gear. Thus, the torque transmitted through sun wheel 125 to spur gear 124 is scaled down and the torsion stress applied to transmission shaft 129 is reduced accordingly. This torque is restored to its initial value through gears 128–126 and transmitted via pinion 123 to the bearing device shown in the right-hand portion of FIG. 6.

It is clear that the centralised control system 130 may if desired be located intermediate the ends of the load carrier mechanism, but it is also obvious that a device similar to the one described hereinabove and shown in FIG. 6 may be used whenever the torque has to be applied to the bearing devices through the medium of a rotary transmission having reduced diametral dimensions.

Although specific forms of embodiment of the invention have been described hereinabove and illustrated in the accompanying drawings, it will readily occur to those skilled in the art that various modifications and changes may be brough thereto without departing from

What we claim is:

1. A device for suspending and wedging loads under aircraft comprising:
   a pair of pivoting suspension hooks aligned along the longitudinal axis of the load to be suspended and adapted each to co-act with a corresponding suspension member of the load,
   a pivot pin for each suspension hook of said pair of suspension hooks,
   means interconnecting said pivot pins for balancing the torques transmitted to said suspension hooks, said mechanism comprising a pair of levers fulcrumed to fixed pivot members and interconnected by a coupling-rod, said pair of levers carrying the pivot pins of said pair of suspension hooks, whereby downward movement of one of said suspension hooks is attended by an upward movement, to the same extent, of the other suspension hook of said pair,
   vertically adjustable bearing members disposed in the vicinity of each suspension hook and adapted to take two end positions comprising a retracted position in which said bearing members do not engage the load and a wedging position in which said bearing members engage the load transversally with relation to the longitudinal axis thereof in order to ensure the wedging of the load,
   and means ensuring a centralised and simultaneous control of the bearing members.

2. A device for suspending and wedging loads under aircraft as claimed in claim 1, wherein said centralised control means comprise, adjacent one of said movable bearing members, a differential gear driving on the one hand the adjacent bearing member and, on the other hand, a torque scaling-down gear driving the other bearing member through the medium of a rotary transmission of relatively great length transmitting reduced torque due to said scaling-down gear, said centralised control means acting on the other bearing member via a re-step-up gear disposed symmetrically in relation to said scaling-down gear and adapted to restore adjacent said second bearing member the equality of the transmitted torque at the level of both bearing members.

3. A device according to claim 1 wherein said centralized control means actuate a pair of sleeves adapted to slide in a substantially vertical direction and which co-act with said bearing members to cause, for the wedging of the load, the bearing members to engage a load.

4. A device according to claim 3 wherein each of said bearing members comprises a pair of pivoted lateral arms constituting together a wedging clamp, the axes of rotation of said lateral arms being movable, the movement of each wedging clamp resulting from substantially vertical rectilinear movement of translation of a slide responsive to an actuation of said centralized control means.

5. A device for suspending and wedging loads under aircraft comprising:
   a pair of pivoting suspension hooks aligned along the longitudinal axis of the load to be suspended and each adapted to co-act with a corresponding suspension member of the load,
   a pivot pin for each hook of said pair of suspension hooks,
   a mechanism interconnecting said pivot pins for balancing the torques transmitted to said hooks,
   vertically adjustable bearing members disposed near each hook and adapted to take two positions comprising a retracted position in which said bearing members do not engage the load and a wedging position in which said bearing members engage the load transversally with relation to the longitudinal axis thereof in order to ensure the wedging of the load, each bearing member comprising a pair of pivoted lateral arms constituting together a wedging clamp, each lateral arm being connected at one end to a common slide and having its opposite end adapted to engage the load, and each lateral arm being pivoted at an intermediate portion about a movable axis of rotation,
   and means providing a centralised and simultaneous control of the bearing members, said means actuating the slide associated with each bearing member to cause a movement of said slides in a substantially vertical direction ensuring the engagement of the load by said bearing members.

6. A device for suspending and wedging loads under aircraft comprising:
   a pair of pivoting suspension hooks aligned along the longitudinal axis of the load to be suspended and each adapted to co-act with a corresponding suspension member of the load,
   a pivot pin for each hook of said pair of suspension hooks,
   a mechanism interconnecting said pivot pins for balancing the torques transmitted to said hooks,
   vertically adjustable bearing members disposed near each hook and adapted to take two positions comprising a retracted position in which said bearing members do not engage the load and a wedging position in which said bearing members engage the load transversally with relation to the longitudinal axis thereof in order to ensure the wedging of the load,
   means providing a centralised and simultaneous control of the bearing members, said centralised control means comprising, adjacent one of said movable bearing members, a differential gear driving on the one hand the adjacent bearing member, and, on the other hand, a torque scaling-down gear driving the other bearing member through a rotary transmission of relatively great length transmitting a reduced torque due to the provision of said scaling-down gear, said centralised control means acting on the other bearing member via a re-step-up gear disposed symmetrically in relation to said scaling-down gear and adapted to restore adjacent said second bearing member the equality of transmitted torque at the level of both bearing members.

* * * * *